United States Patent [19]

Röhm

[11] Patent Number: 4,609,199
[45] Date of Patent: Sep. 2, 1986

[54] HAMMER-DRILL CHUCK WITH ADJUSTABLE AXIAL PLAY

[76] Inventor: Günter H. Röhm, Heinrich-Röhm-Str. 50, 7927 Sonthiem, Fed. Rep. of Germany

[21] Appl. No.: 702,049

[22] Filed: Feb. 15, 1985

[30] Foreign Application Priority Data

Feb. 18, 1984 [DE] Fed. Rep. of Germany ....... 3405980

[51] Int. Cl.$^4$ .......................... B23B 31/12; B23B 31/36
[52] U.S. Cl. .................................... 279/1 B; 173/139; 279/19; 279/19.4
[58] Field of Search ............ 279/1 ME, 1 B, 19, 19.3, 279/19.4, 19.5, 60–65, 1 R; 173/48, 139; 408/241 R

[56] References Cited

U.S. PATENT DOCUMENTS

| 951,013 | 3/1910 | Lane | 279/19.4 |
|---|---|---|---|
| 3,929,343 | 12/1975 | Wanner et al. | 279/62 X |
| 4,231,581 | 11/1980 | Benedict | 279/19.4 |
| 4,491,444 | 1/1985 | Rumpp et al. | 279/19.4 X |
| 4,491,445 | 1/1985 | Hunger et al. | 279/19.3 X |

FOREIGN PATENT DOCUMENTS

| 29968 | 6/1981 | European Pat. Off. | 279/19 |
|---|---|---|---|
| 3132449 | 7/1983 | Fed. Rep. of Germany. | |
| 2034210 | 6/1980 | United Kingdom | 279/62 |

Primary Examiner—Gil Weidenfeld
Assistant Examiner—Steven C. Bishop
Attorney, Agent, or Firm—Karl F. Ross; Herbert Dubno

[57] ABSTRACT

A hammer-drill chuck has a tubular chuck body centered on an axis and formed with a plurality of guides angularly spaced thereabout, respective jaws displaceable along the guides between inner and outer positions, and an adjustment element displaceable on the body and coupled to the jaws for displacing same between their inner and outer positions. Thus the rear end of a drill bit can be fitted into the passage and gripped between the jaws. A spindle centered on, rotatable about, and reciprocal through a predetermined stroke along the axis projects partially through the chuck body so the rear end of the bit gripped by the jaws can be hammered by a front end of the spindle. At least one coupling element radially but not axially or angularly displaceable in the chuck body engages an axially extending formation on the spindle which is of such an axial length that when the spindle reciprocates axially relative to the chuck body it urges the coupling element radially outward. A spring member urges the coupling element radially inward against the formation.

5 Claims, 4 Drawing Figures

HAMMER-DRILL CHUCK WITH ADJUSTABLE AXIAL PLAY

FIELD OF THE INVENTION

The present invention relates to a drill chuck. More particularly this invention concerns a hammer-drill chuck whose chuck body can move limitedly relative to the drill spindle.

BACKGROUND OF THE INVENTION

A standard hammer-drill chuck such as described in U.S. Pat. No. 4,491,445 of J. Hunger et al has a spindle centered on, rotatable about, and reciprocal through a predetermined stroke along an axis and a chuck body carried on the spindle and formed with a plurality of guides angularly spaced about the axis. Respective jaws displaceable along the guides between inner and outer positions are operated by an adjustment element on the body that is coupled to the jaws for displacing them between their inner and outer positions.

The spindle has an axial front end that engages the axial rear end of a drill bit held in the generally tubular chuck body between the jaws. During hammer drilling this spindle rotates about the axis and also reciprocates, so that it hammers directly on the rear end of the bit. The spindle is formed with a radially outwardly open notch having a chordal base, and the chuck is provided with an internal chordally extending bolt passing through the notch. The notch is axially somewhat longer than the diameter of the bolt, so this bolt rotationally couples the body to the spindle, but permits the body and spindle to move axially relative to each other through an axial play that is equal to the difference between the bolt diameter and the axial notch length.

The problem with such an arrangement is that when hammer drilling in something particularly soft the axial stroke of the device is at a maximum and the bolt strikes against the ends of the notch. This results in damage to the bolt and/or chuck body. This problem is particularly aggravated when a bit is used which has a cylindrical rather than a grooved shaft, as in such arrangements the bit must be solidly clamped between the jaws.

OBJECTS OF THE INVENTION

It is therefore an object of the present invention to provide an improved hammer-drill chuck.

Another object is the provision of such a hammer-drill chuck which overcomes the above-given disadvantages, that is which eliminates the possibility of the above-described type of damage to the chuck.

A further object is to make the axial play of the chuck adjustable for switching between hammer drilling when such play is necessary and purely rotary drilling when it is undesirable.

SUMMARY OF THE INVENTION

A hammer-drill chuck has a tubular chuck body centered on an axis and formed with a plurality of guides angularly spaced thereabout, respective jaws displaceable along the guides between inner and outer positions, and an adjustment element displaceable on the body and coupled to the jaws for displacing same between their inner and outer positions. Thus, as is known, the rear end of a drill bit can be fitted into the passage and gripped between the jaws. A spindle centered on, rotatable about, and reciprocatable through a predetermined stroke along the axis projects partially through the chuck body so the rear end of the bit gripped by the jaws can be hammered by a front end of the spindle. According to this invention at least one coupling element radially but not axially or angularly displaceable in the chuck body engages an axially extending formation on the spindle which is of such an axial length that when the spindle reciprocates axially relative to the chuck body it urges the coupling element radially outward. A spring member urges the coupling element radially inward against the formation.

Thus with the system of this invention when the reciprocation stroke is so long that the coupling element comes to the end of the formation, the axial force is transformed into radial force and damped. As a result the chuck and coupling element will not be damaged when the stroke is long, as for example when drilling soft material. In addition the entire assembly can have a relatively short length.

According to a feature of this invention the formation is an axially extending and radially outwardly open groove formed in the spindle and having axially opposite rounded ends. In addition the coupling element has a radial inner end that fits substantially without angular play in the groove. Such construction is extremely simple and compact, as it combines the functions of angular and axial coupling in one unit.

The spring member according to the invention is a spring ring annularly surrounding the chuck body. This ring is rotatable about the axis on the chuck body and is formed with a relatively shallow inwardly open recess in which the coupling element is engageable for limited axial play between the chuck body and the spindle, with a relatively deep recess permitting the coupling element to pull completely radially out of the notch and thereby free the chuck body from the spindle, and a portion radially engageable with the coupling element for forcing it radially tightly into the notch for locking the body on the spindle. Thus it is possible to combine several features in the force-damping spring element, a releasable chuck mount plus a selector for hammer or purely rotary drilling.

In accordance with another feature of this invention a latch is engageable between the chuck body and the spring ring for defining therefor stable positions respectively corresponding to alignment of the coupling element with the recesses and portion. This latch includes a radially outwardly biased latch element and respective position-defining and inwardly open recesses in the ring. The ring itself is formed between the recesses with an angularly extending groove in which the latch element engages for axial coupling of the spring ring and the chuck body.

DESCRIPTION OF THE DRAWING

The above and other features and advantages will become more readily apparent from the following, reference being made to the accompanying drawing in which.

SPECIFIC DESCRIPTION

Figure 2:
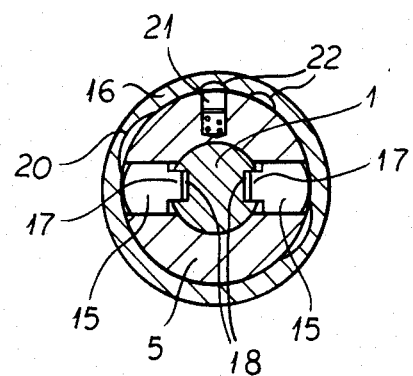
FIGS. 2 and 4 are cross sections taken respectively along lines II—II and IV—IV of FIGS. 1 and 3.
Figure 1:
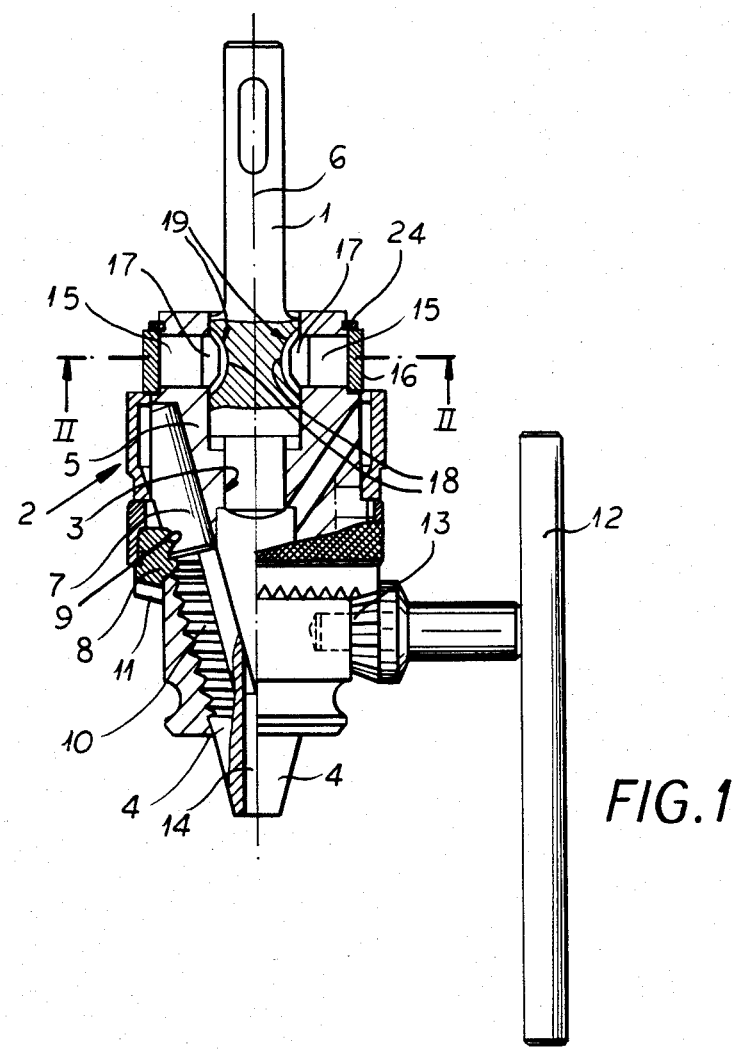
FIGS. 1 and 3 are axial sections through hammer-drill chucks according to this invention.

As seen in FIGS. 1 and 2 a chuck 2 has a spindle 1 extending along and centered on an axis 6 and a chuck body 5 formed with a central passage 3 through which the spindle 1 projects axially and with three angularly equispaced guides 7 receiving respective jaws 4. Teeth 20 on the outer edges of the jaws 4 mesh with a screwthread 9 of an adjustment ring 8 so these jaws 4 can be clamped on the shank of a drill bit inserted axially back (up in FIG. 1) into the passage 3. An array of axially forwardly directed teeth 11 on the ring 8 can mesh with the gear 13 of a standard chuck key 12 for tightening or loosening the chuck 2. The jaws 4 have hardened-metal edges or claddings 14 that can engage and even bite into the bit they hold.

The chuck 2 according to this invention has at the rear end of the chuck body 5 a stroke-selection element or ring 16 which is of springy construction and which bears on the axial outer ends of two identical and diametrically opposed coupling bodies 15 having square-section heads 17 engaging in complementary square-section axial grooves 18 in the spindle 1. These grooves 18 are axially longer than the heads 17 and have rounded end regions 19 complementary the end regions of the heads 16.

Thus with this arrangement if the axial stroke of the spindle 1 exceeds the difference between the axial length of the grooves 18 and the axial length of the heads 16, the coupling elements 15 will be forced somewhat radially outward, spreading the spring ring 16. Thus there will be no damage to the structure.

The ring 16 is held axially in place by a snap ring 24 and is rotatable on the chuck body 5 about the axis 6 between two positions determined by a spring-loaded detent 21 that can fit into either of two radially inwardly open recesses 22 in this ring 16. In the one position the outer ends of the coupling members 15 bear against the cylindrical inner surface of the ring 16. In the other position they are receivable in recesses 20 in this ring 16, in which position the elements 15 can pull completely out of the grooves 18 and allow the entire chuck 2, even while still holding a drill bit, to be pulled off the spindle 1.

Figure 4:
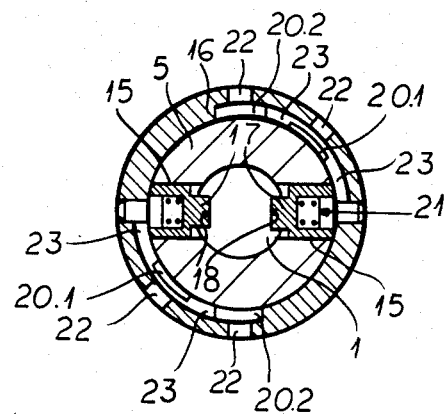
Figure 3:
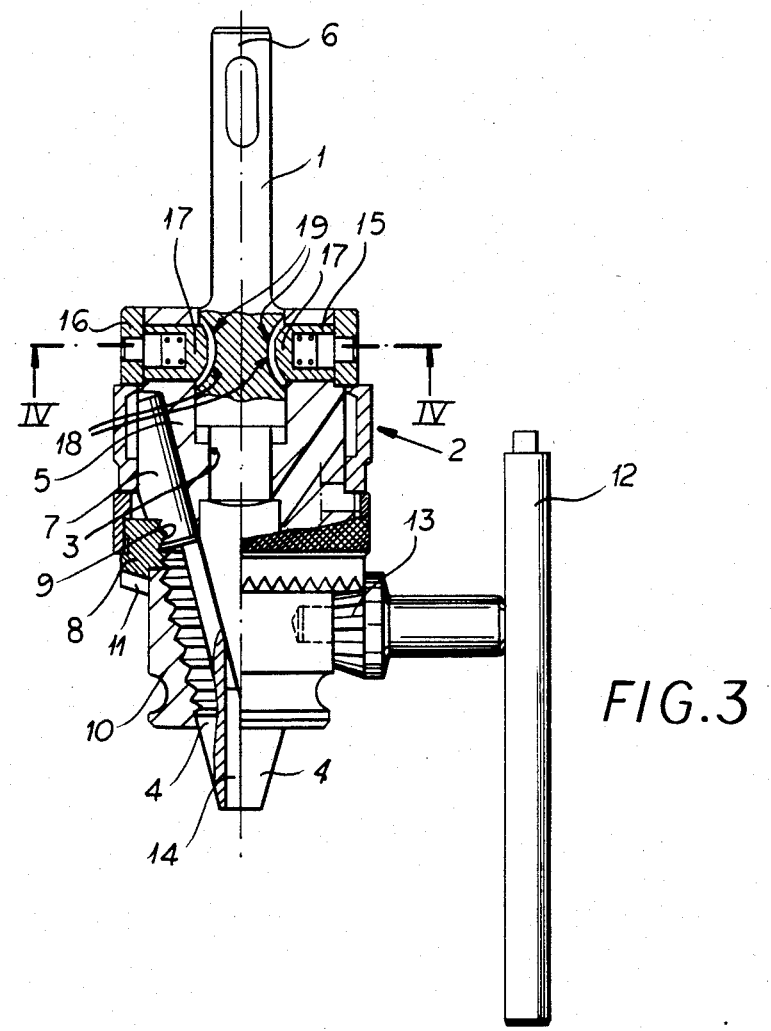

The arrangement of FIGS. 3 and 4 is similar, using the same reference numerals for the same structure. Here the stroke-selector ring 16 can be moved through three positions. In the first position the cylindrical inner surface bears against the outer ends of the coupling elements 15 and they are pressed tightly into the grooves 18. This is the illustrated position and is used when purely rotary drilling with no hammer action is used.

In the second position the outer ends of the elements 15 can move out into relatively shallow recesses 20.1 that provide some play as described above with reference to FIGS. 1 and 2 for hammer drilling.

In the third position the outer ends of the elements 15 can engage in relatively deep recesses 20.2 that allow the chuck 2 to be removed from the spindle 1.

These recesses 20.1 and 20.2 are joined and continued by a groove 23 into which fit spring-loaded latching elements 21 carried in the coupling elements 15. Thus these elements 21 serve to define three stable positions for the ring 16 on the body 5, while their engagement in the groove 23 axially couples this ring 16 to the body 5, eliminating the need for the snap ring 24. The holes 22 into which the latches 21 fit are radially throughgoing, so the ring 16 can only be rotated on the chuck body 5 when the latches 21 are pressed in by a special tool, eliminating the possibility of accidental maladjustment of the chuck.

I claim:

1. A hammer-drill chuck for use with a drill bit having a rear end, the chuck comprising:
    a tubular chuck body formed with a throughgoing passage centered on an axis and formed with a plurality of guides angularly spaced thereabout;
    respective jaws displaceable along the guides between inner and outer positions;
    an adjustment element displaceable on the body and coupled to the jaws for displacing same between their inner and outer positions, whereby the rear end of the drill bit can be fitted into the passage and gripped between the jaws;
    a spindle centered on, rotatable about, and reciprocatable through a predetermined stroke along the axis and having a front end projecting into the chuck body, whereby the rear end of the bit gripped by the jaws can be hammered by the front end of the spindle, the spindle being formed with an axially extending, radially outwardly open, and generally square-section groove having rounded axially opposite ends;
    at least one coupling element radially but not axially or angularly displaceable in the chuck body and having a generally square section head fitting without play in the groove, the groove being between its ends of an axial length greater than that of the coupling head such that when the spindle reciprocates axially relative to the chuck body to engage the head with the rounded groove ends the coupling element is cammed by the rounded groove ends radially outward; and
    a spring member urging the coupling element radially inward against the formation.

2. The hammer-drill chuck defined in claim 1 wherein the spring member is a spring ring annularly surrounding the chuck body.

3. The hammer-drill chuck defined in claim 2 wherein the spring ring is rotatable about the axis on the chuck body and is formed with a relatively shallow inwardly open recess in which the coupling element is engageable for limited axial play between the chuck body and the spindle, with a relatively deep recess permitting the coupling element to pull completely radially out of the notch and thereby free the chuck body from the spindle, and a portion radially engageable with the coupling element for forcing it radially tightly into the notch for locking the body on the spindle.

4. The hammer-drill chuck defined in claim 3, further comprising
    latch means engageable between the chuck body and the spring ring for defining therefor stable positions respectively corresponding to alignment of the coupling element with the recesses and portion.

5. The hammer-drill chuck defined in claim 4 wherein the latch means includes a radially outwardly biased latch element and respective position-defining and inwardly open recesses in the ring, the ring being formed between the recesses with an angularly extending groove in which the latch element engages for axial coupling of the spring ring and the chuck body.

* * * * *